United States Patent
Long et al.

(10) Patent No.: US 8,886,812 B2
(45) Date of Patent: Nov. 11, 2014

(54) METHOD, APPARATUS, AND SYSTEM FOR SERVICE CONTROL VIA I1 INTERFACE

(75) Inventors: Shuiping Long, Beijing (CN); Hui Jin, Beijing (CN); Xiaoyan Duan, Beijing (CN)

(73) Assignee: Huawei Technologies Co., Inc., Shenzhen (CN)

( * ) Notice: Subject to any disclaimer, the term of this patent is extended or adjusted under 35 U.S.C. 154(b) by 211 days.

(21) Appl. No.: 13/370,843

(22) Filed: Feb. 10, 2012

(65) Prior Publication Data

US 2012/0144046 A1 Jun. 7, 2012

Related U.S. Application Data

(63) Continuation of application No. PCT/CN2010/075724, filed on Aug. 5, 2010.

(30) Foreign Application Priority Data

Aug. 12, 2009 (CN) .......................... 2009 1 0165624

(51) Int. Cl.
G06F 15/16 (2006.01)
H04L 29/06 (2006.01)

(52) U.S. Cl.
CPC ........ *H04L 65/1016* (2013.01); *H04L 65/1043* (2013.01); *H04L 65/1069* (2013.01); *H04L 65/1006* (2013.01)
USPC .............................. 709/227; 709/228; 709/230

(58) Field of Classification Search
CPC . H04L 65/1006; H04L 65/1083; H04M 7/123
USPC .......................................... 709/227, 228, 230
See application file for complete search history.

(56) References Cited

U.S. PATENT DOCUMENTS 7,804,820 B2 * 9/2010 Shi et al. ....................... 370/353
2008/0117893 A1 5/2008 Witzel et al.

(Continued)

FOREIGN PATENT DOCUMENTS

CN 101009693 A 8/2007
CN 101114985 A 1/2008

(Continued)

OTHER PUBLICATIONS

"3rd Generation Partnership Project: Technical Specification Group Core Network and Terminals; IMS Centralized Services (ICS) Protocol via I1 Interface; (release 9)." 3GPP Standard TS 24.294, Mobile Competence Centre, No. V0.3.0, Aug. 1, 2009. pp. 1-30.*

(Continued)

*Primary Examiner* — Nicholas Taylor
(74) *Attorney, Agent, or Firm* — Slater & Matsil, L.L.P.

(57) ABSTRACT

Embodiments of the present invention disclose a method, an apparatus, and a system for service control via an I1 interface. The method includes: sending a Session Initiation Protocol Invite message to a user equipment through a Gm interface; if receiving a response message returned by the user equipment, where the response message indicates that the user equipment chooses to use a circuit switched bearer and use an I1 interface for control, sending an I1 Invite message to the user equipment through the I1 interface, where I1 Invite message carries information indicating that Gm interface control falls back to the I1 interface control and information used to associate the Session Initiation Protocol Invite message.

7 Claims, 7 Drawing Sheets

(56) References Cited

U.S. PATENT DOCUMENTS

| | | | |
|---|---|---|---|
| 2009/0052385 A1 | 2/2009 | Sylvain et al. | |
| 2010/0238841 A1 | 9/2010 | Long et al. | |
| 2011/0202666 A1* | 8/2011 | Heidermark et al. | 709/227 |
| 2011/0238845 A1* | 9/2011 | Keller et al. | 709/227 |
| 2012/0127960 A1* | 5/2012 | Lei | 370/332 |

FOREIGN PATENT DOCUMENTS

| | | | |
|---|---|---|---|
| CN | 101453453 A | 5/2009 | |
| CN | 101459970 A | 6/2009 | |
| CN | 101494648 A | 7/2009 | |
| CN | 101997697 B | 6/2012 | |
| WO | WO 2007/085154 A1 | 8/2007 | |

OTHER PUBLICATIONS

3$^{rd}$ Generation Partnership Project; Technical Specification Group Core Network and Terminals; IMS Centralized Services (ICS) Protocol via I1 Interface; (Release 9), 3GPP TS 24.294 V0.3.0, Aug. 2009, 30 pages.

Extended European Search Report received in Application No. 10807953.4-1853, Applicant: Huawei Device Co., Ltd., mailed Feb. 13, 2013, 8 pages.

International Search Report and Translation received in the Patent Cooperation Treaty Application No. PCT/CN2010/075724, mailed Nov. 18, 2010, 8 pages.

Written Opinion of the International Searching Authority and Translation received in Patent Cooperation Treaty Application No. PCT/CN2010/075724, mailed Nov. 18, 2010, 5 pages.

Research in Motion, "Introduction of I1 Mobile Originated Session Using Enhanced MSC for ICS," 3GPP TSG CT WG1 Meeting #58, C1-092254, Change Request, rev. 3, v. 8.1.0, Sophia Antipolis, France, Apr. 20-24, 2009, 9 pages.

Research in Motion, "Introduction of I1 Mobile Terminated Session Using Enhanced MSC for ICS," 3GPP TSG CT WG1 Meeting #58, C1-092255, Change Request, rev. 3, v. 8.1.0, Sophia Antipolis, France, Apr. 20-24, 2009, 10 pages.

"Technical Specification Group Core Network and Terminals; IP Multimedia (IM) Core Network (CN) Subsystem Centralized Services (ICS); Stage 3," 3GPP TS 24.292, v. 9.0.0, Jun. 2009, 164 pages.

* cited by examiner

METHOD, APPARATUS, AND SYSTEM FOR SERVICE CONTROL VIA I1 INTERFACE

CROSS-REFERENCE TO RELATED APPLICATIONS

This application is a continuation of international Application No. PCT/CN2010/075724, filed on Aug. 5, 2010, which claims priority to Chinese Patent Application No. 200910165624.8, filed on Aug. 12, 2009, both of which are hereby incorporated by reference in their entireties.

FIELD OF THE INVENTION

The present invention relates to the field of communication technologies, and in particular, to a method, an apparatus, and a system for service control via the I1 interface.

BACKGROUND OF THE INVENTION

IMS centralized services (IMS Centralized Services, ICS) support use of circuit switched (Circuit Switched, CS) access to bear a media stream to implement Internet Protocol multimedia subsystem (IP Multimedia Subsystem, IMS) services. A service centralization and continuity (Service Centralization and Continuity, SCC) application server (Application Server, AS) is an application server that supports the ICS and is used to act as an agent of a user equipment (User Equipment, UE) to perform IMS session control, for example, being triggered by the UE to initiate an IMS session.

The ICS working group already completes the standardization of the framework, and implementation of the standardization of the ongoing protocol relates to stipulating a new protocol, that is, an ICS control protocol (or known as an I1 protocol). The I1 protocol is an application protocol on the I1 interface. The I1 interface is a new interface introduced by the ICS working group. The I1 interface is located between the UE and the SCC AS and used to transfer IMS service control signaling. The I1 interface is based on CS access, for example, the application protocol message of the I1 interface is transferred through unstructured supplementary service data (Unstructured Supplementary Service Data, USSD) or short message service (Short Message Service, SMS).

Considering the SCC AS in the ICS needs to implement an interworking operation between the I1 protocol and the Session Initiation Protocol (Session Initiation Protocol, SIP), the I1 protocol may use most of concepts or terms of the SIP. To make a difference, an I1 prefix is usually added before the concepts or terms of SIP to indicate the concepts or terms of the I1 protocol.

Because there are a large number of IMS sessions, the I1 protocol, as an IMS session control protocol, also has a large traffic volume (that is, overheads generated in the transfer of I1 protocol messages). Various applications or value-added services are already developed on the basis of the USSD or the SMS. Therefore, if the I1 protocol uses the USSD or the SMS as the transmission protocol, traffic of the USSD or the SMS may be greatly affected. Therefore, the ICS working group requires that the message overheads of the I1 protocol should be minimized during the design.

SUMMARY OF THE INVENTION

The technical problem to be solved by embodiments of the present invention is to provide a method, an apparatus, and a system for service control via the I1 interface.

To solve the above technical problem, the method for service control via the I1 interface according to the present invention may be implemented by using the following technical solution:

sending a Session Initiation Protocol Invite message to a user equipment through a Gm interface; and if receiving a response message returned by the user equipment, where the response message indicates that the user equipment chooses to use a circuit switched bearer and an I1 interface for control, sending an I1 Invite message to the user equipment through the I1 interface, where the I1 Invite message carries information indicating that Gm interface control falls back to the I1 interface control and information used to associate the Session Initiation Protocol Invite message.

An embodiment of the present invention also provides a method for service control via the I1 interface, including:

receiving an I1 Invite message sent by a user equipment, where the I1 Invite message carries a service control switching request indication and a Session Initiation Protocol dialog identifier of an Internet Protocol multimedia subsystem session;

searching for the Internet Protocol multimedia subsystem session through the Session Initiation Protocol dialog identifier; and sending a message, which indicates that service control is switched successfully, to the user equipment.

An embodiment of the present invention also provides a service centralization and continuity application server, including:

a Session Initiation Protocol Invite message sending unit, configured to send a Session Initiation Protocol Invite message to a user equipment through a Gm interface;

a response message receiving unit, configured to receive a response message returned by the user equipment, where the response message indicates that the user equipment chooses to use a circuit switched bearer and use an I1 interface for control; and an I1 Invite message sending unit, configured to send an I1 Invite message to the user equipment through the I1 interface if the response message receiving unit receives the response message, where the I1 Invite message carries information indicating that Gm interface control falls back to the I1 interface control and information used to associate the Session Initiation Protocol Invite message.

An embodiment of the present invention also provides an service centralization and continuity application server, including:

an I1 Invite message receiving unit, configured to receive an I1 Invite message sent by a user equipment, where the I1 Invite message carries a service control switching request indication and a Session Initiation Protocol dialog identifier of an Internet Protocol multimedia subsystem session;

a session searching unit, configured to search for the Internet Protocol multimedia subsystem session through the Session Initiation Protocol dialog identifier; and a switching success message sending unit, configured to send a message, which indicates that service control is switched successfully, to the user equipment.

An embodiment of the present invention also provides a user equipment, including:

an Invite message receiving unit, configured to receive, through a Gm interface, a Session Initiation Protocol Invite message sent by a service centralization and continuity application server;

a response message sending unit, configured to send a response message after the Session Initiation Protocol Invite message is received, where the response message indicates that the user equipment chooses to use a circuit switched bearer and use an I1 interface for control;

an I1 Invite message receiving unit, configured to receive an I1 Invite message through the I1 interface; and an I1 Invite message parsing unit, configured to: parse the I1 Invite message to obtain information indicating that Gm interface control falls back to the I1 interface control and information used to associate the Session Initiation Protocol Invite message.

An embodiment of the present invention also provides a user equipment, including:

an I1 Invite message sending unit, configured to send an I1 Invite message to an service centralization and continuity application server, where the I1 Invite message carries a service control switching request indication and a Session Initiation Protocol dialog identifier of an Internet Protocol multimedia subsystem session; and a switching success message receiving unit, configured to receive a message indicating that service control is switched successfully.

An embodiment of the present invention also provides a system for service control via the I1 interface, including:

a service centralization and continuity application server and a user equipment.

The service centralization and continuity application server includes:

a Session Initiation Protocol Invite message sending unit, configured to send a Session Initiation Protocol Invite message to the user equipment through a Gm interface;

a response message receiving unit, configured to receive a response message returned by the user equipment, where the response message indicates that the user equipment chooses to use a circuit switched bearer and use an I1 interface for control; and an I1 Invite message sending unit, configured to send an I1 Invite message to the user equipment through the I1 interface if the response message receiving unit receives the response message, where the I1 Invite message carries information indicating that Gm interface control falls back to the I1 interface control and information used to associate the Session Initiation Protocol Invite message.

The user equipment includes:

an Invite message receiving unit, configured to receive, through a Gm interface, a Session Initiation Protocol Invite message sent by the service centralization and continuity application server;

a response message sending unit, configured to send a response message after the Session Initiation Protocol Invite message is received, where the response message indicates that the user equipment chooses to use a circuit switched bearer and use an I1 interface for control;

an I1 Invite message receiving unit, configured to receive an I1 Invite message through the I1 interface; and an I1 Invite message parsing unit, configured to: parse the I1 Invite message to obtain information indicating that Gm interface control falls back to the I1 interface control and information used to associate the Session Initiation Protocol Invite message.

An embodiment of the present invention provides another system for service control via the I1 interface, including:

a service centralization and continuity application server and a user equipment.

The service centralization and continuity application server includes:

an I1 Invite message receiving unit, configured to receive an I1 Invite message sent by the user equipment, where the I1 Invite message carries a service control switching request indication and a Session Initiation Protocol dialog identifier of an Internet Protocol multimedia subsystem session;

a session searching unit, configured to search for the Internet Protocol multimedia subsystem session through the Session Initiation Protocol dialog identifier; and a switching success message sending unit, configured to send a message, which indicates that service control is switched successfully, to the user equipment.

The user equipment includes:

an I1 Invite message sending unit, configured to send an I1 Invite message to the service centralization and continuity application server, where the I1 Invite message carries a service control switching request indication and a Session Initiation Protocol dialog identifier of an Internet Protocol multimedia subsystem session; and a switching success message receiving unit, configured to receive a message indicating that service control is switched successfully.

The foregoing technical solution has the following benefits: A replace header field of the I1 Invite message is used to carry information indicating that Gm interface control falls back to the I1 interface control and information used to associate the Session Initiation Protocol Invite message, which may omit the calling user identifier and the called user identifier, and reduces overheads of the I1 protocol message.

BRIEF DESCRIPTION OF THE DRAWINGS

To illustrate the technical solution in the embodiments of the present invention or in the prior art more clearly, the accompanying drawings for describing the embodiments of the present invention or the prior art are briefly described below. Evidently, the accompanying drawings are only some embodiments of the present invention, and persons of ordinary skill in the art can derive other drawings from these accompanying drawings without any creative effort.

DETAILED DESCRIPTION OF THE EMBODIMENTS

The technical solutions provided by the embodiments of the present invention are hereinafter described clearly and completely with reference to the accompanying drawings in the embodiments of the present invention. Apparently, the embodiments described below are only a part rather than all of the embodiments of the present invention. Based on the embodiments of the present invention, all other embodiments that persons of ordinary skill in the art derive without making any creative effort, fall within the protection scope of the present invention.

During the design of the I1 protocol, message overheads may be reduced from the following two perspectives: reducing information transfer and efficiently encoding information to be transferred. In the embodiments of the present invention, the message overheads are reduced from the perspective of reducing information transfer.

The overhead optimization designs in the I1 protocol solution in calling and called scenarios are as follows:

(1) The I1 protocol does not include the via (Via) header function, record-route (Record-route) header function, and route (Route) header function in SIP.

(2) As for the Session Description Protocol (Session Description Protocol, SDP) functions, The I1 protocol includes only some of the, SDP functions in SIP.

(3) The I1 Invite (Invite) message includes the calling user identifier and the called user identifier of an IMS session. Subsequent responses or requests do not need to include the calling user identifier and the called user identifier but use a combination of the Call-ID (Call-ID), From tag (From tag), and To tag (To tag) to associate the IMS session.

The following describes optimization solutions in the calling and called scenarios:

Scenario 1: ICS UE is Calling

Figure 1:
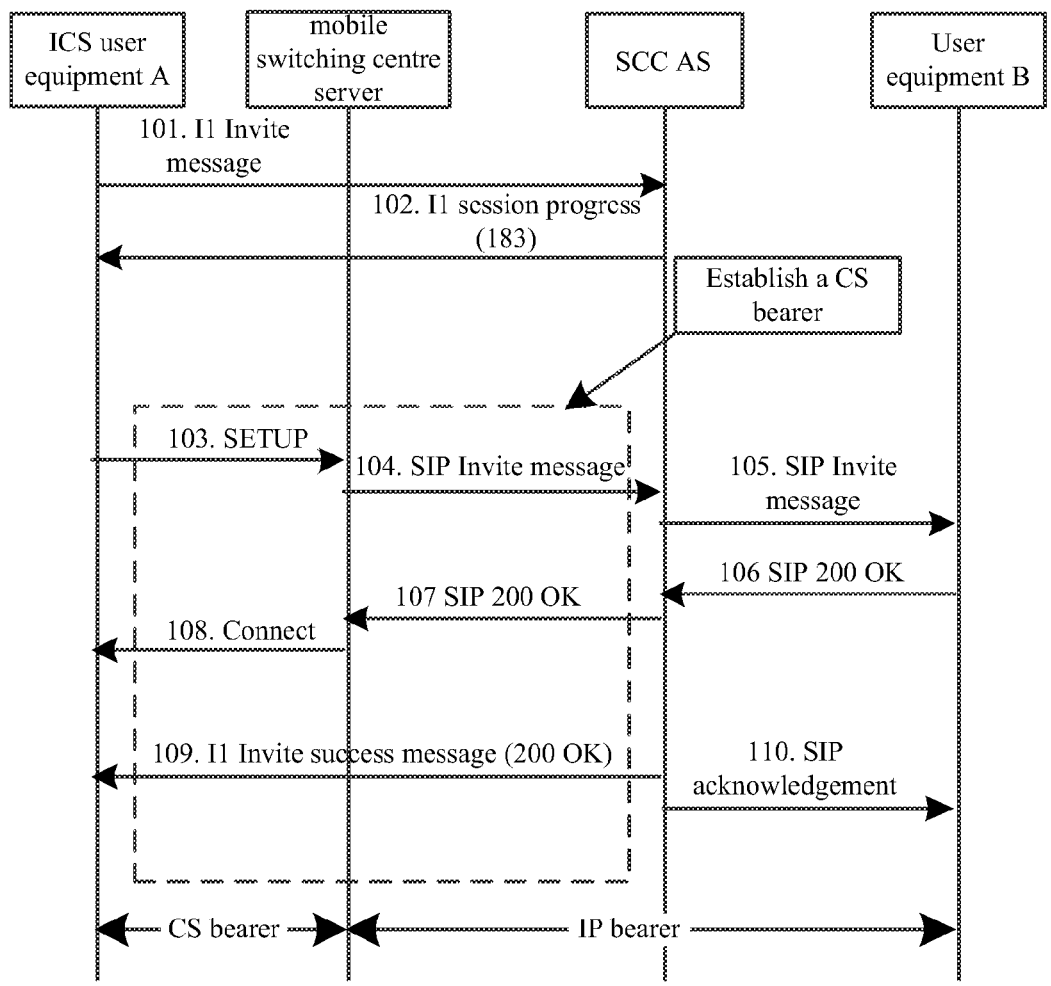
FIG. 1 is a schematic flowchart of a method for an ICS UE to call according to an embodiment of the present invention.

In this procedure, ICS UE A initiates an IMS session through the I1 interface; the SCC AS allocates a public service identity directory number (Public Service Identity Directory Number, PSI DN) which is used by the UE to initiate a CS call to establish a CS bearer (bearer) (the CS bearer is used to transmit media streams of the IMS session); after the SCC AS receives a SIP Invite (invite) message sent by the mobile switching centre (Mobile Switching Centre, MSC) server (server) or the media gateway control function (Media Gateway Control Function, MGCF) in the CS domain, the SCC AS replaces UE A to generate a SIP Invite message to initiate an IMS session. The specific procedure is as shown in FIG. 1:

Step 101: ICS UE A sends an I1 Invite message through the I1 interface to initiate an IMS session, where the I1 Invite message includes the following information:

an I1 Call-ID (Call-ID), used to identify the IMS session or call on the I1 interface, for example, set to 2037701kfjs;

an I1 From header (From header), where the value of the header field is used to indicate the calling user identifier of this session, for example, set to user_a@example.com, where the From header also includes a tag (tag, where the tag is used to be combined with the I1 Call-ID to identify the IMS session or Call on the I1 interface and the tag may not be set or transferred to reduce the message overheads), for example, the tag is set to a2ci;

an I1 To header (To header), where the value of the header field is used to indicate the called user identifier of the IMS session, for example, set to user_b@example.com; and an I1 command sequence (CSeq, Command Sequence), used to indicate the sequence of the I1 command (or known as an I1 request or I1 method). When UE A generates the I1 Invite request, a numerical value is selected at random as the CSeq value, for example, 1688. When UE A sends other I1 requests subsequently, 1 is added to the CSeq value continuously. The CSeq also includes method (method) information used to indicate an I1 Invite message. The SCC AS may copy the CSeq when sending a response to the I1 Invite message so that the UE A matches the I1 request with the I1 response. The I1 command may be the I1 Invite message or another command (request or method) message sent through the I1 interface, and is not limited in the embodiment of the present invention.

Step 102: After receiving the I1 Invite message, the SCC AS stores the Call-ID, From header, To header, and command sequence (the SCC AS also generates and maintains its own command sequence when sending an I1 request subsequently), and sends an I1 session progress message, which includes the following information:

an I1 Call-ID, copied from the I1 Invite message;

an I1 From header, copied from the I1 Invite message, with the calling user identifier being deleted;

an I1 To header, copied from the I1 Invite message, with the called user identifier being deleted, where a tag (the tag is combined with the I1 Call-ID to identify the IMS session or Call-ID on the I1 interface and may not be set or transferred to reduce the message overhead) is generated and included in the To header, for example, tag=u7c3, where the I1 Call-ID, the I1 From tag, and the I1 To tag are combined to uniquely identify an IMS session or a call on the I1 interface;

an I1 command sequence (CSeq), copied from the I1 Invite message; and

SDP (Session Description Protocol, Session Description Protocol) information, including a PSI DN used by ICS UE A to initiate a CS call to establish a CS bearer (or known as a CS connection), where the CS bearer is used to transmit media streams of the IMS session, and the PSI DN is associated with the SCC AS, for example, the PSI DN is set to +12125556666. The UE may subsequently send a CS call to the SCC AS by using the PSI DN. In other I1 requests or responses, the SDP information may also include other information, for example, I1 Update (SDP (a=inactive)), which is used to indicate that the IMS session is held (hold).

Step 103 to step 104: ICS UE A initiates a CS call by using the PSI DN as a called number; the MSC server or the MGCF (Media Gateway Control Function, media gateway control function) in the CS domain performs conversion between CS signaling and SIP signaling, and generates a SIP Invite message (including the PSI DN), where the SIP Invite message is finally transmitted to the SCC AS. The SCC AS associates the stored I1 Invite message by using the PSI DN.

Note: After step 102, when UE A may send another I1 request, for example, an I1 Update request, the CSeq:1689 Update should be set.

Step 105 to step 106: The SCC AS generates a SIP Invite message (including a called user identifier and CS bearer information, where the CS bearer information is used by UE B to transmit a media stream), where the SIP Invite message is finally transmitted to UE B. a user of UE B picks up the phone to accept the IMS session invitation, and sends a success message (200 OK) to indicate that the user already picks up the phone.

Step 107 to step 108: The SCC AS sends a 200 OK to the MSC server or the MGCF to indicate that the CS call is established successfully. The MSC server sends a connect message to UE A to indicate that the CS call is established successfully.

Step 109: The SCC AS sends an I1 200 OK response through the I1 interface to indicate that the IMS session is established successfully. The header field of the I1 200 OK is the same as that of an I1 session progress message, while the SDP part does not include the PSI DN.

Step 110: The SCC AS sends a SIP ACK request to UE B to acknowledge the 200 OK (received). The SCC AS does not need to wait for UE A to acknowledge the reception of the I1 200 OK, but may use reliable transmission capability of the lower transport layer protocol (for example, the USSD or the SMS).

Scenario 2: ICS UE is Called

Figure 2:
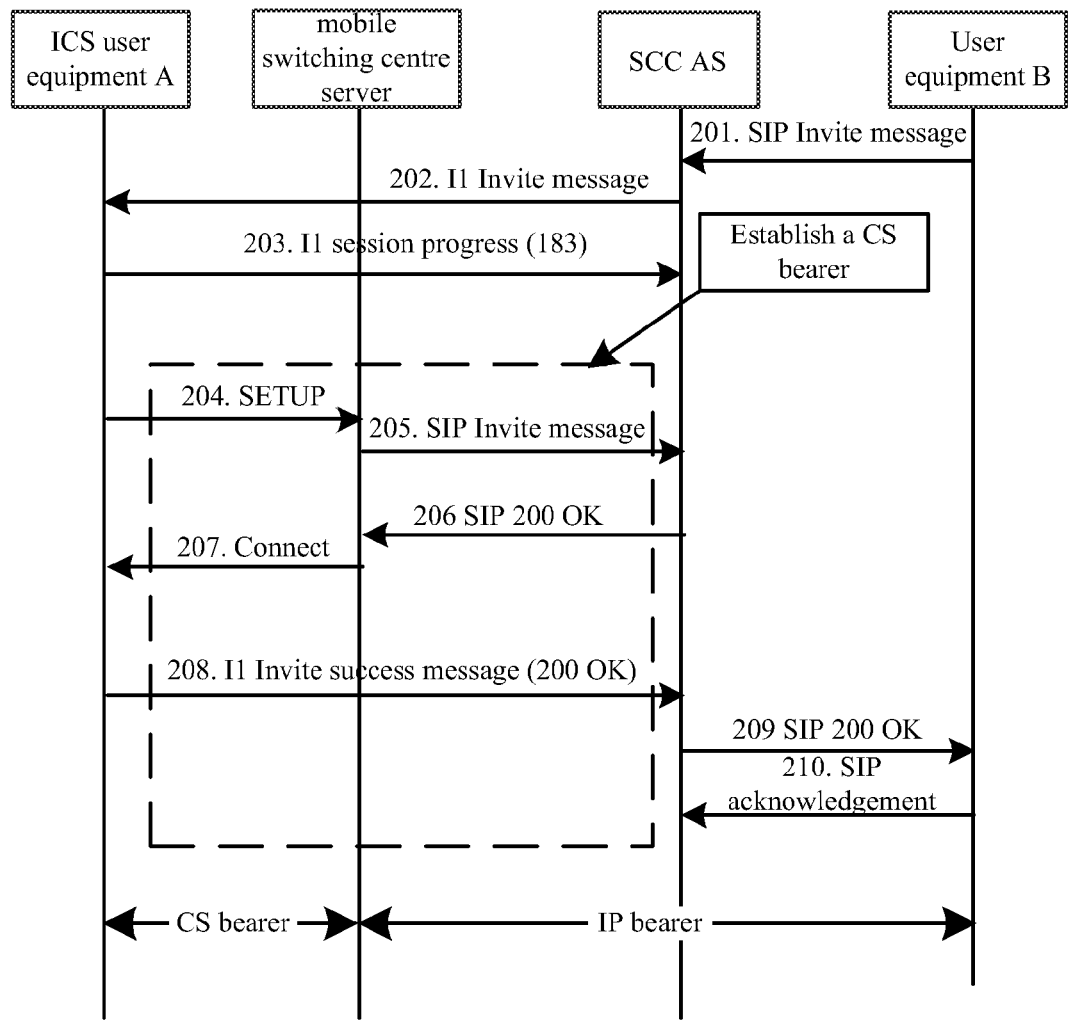
FIG. 2 is a schematic flowchart of a method for an ICS UE to be called according to an embodiment of the present invention.

In this procedure, the SCC AS delivers an IMS session Invite message through the I1 interface, which includes a PSI DN used by the UE to initiate a CS call to establish a CS bearer (used to transmit a media stream of the IMS session). The specific procedure is as shown in FIG. 2:

Step 201: The SCC AS receives a SIP Invite message that includes a calling user identifier (for example, set to user_b@example.com) and a called user identifier (for example, set to user_a@example.com).

Step 202: The SCC AS sends an I1 Invite message to ICS UE A through the I1 interface, where the I1 Invite message includes the following information (the information is also stored by the SCC AS):

an I1 Call-ID (Call-ID), used to identify the IMS session or call on the I1 interface, for example, set to 9t3j9xsdfw9tg374js7usjv;

an I1 From header (From header), used to indicate the calling user identifier of the IMS session, for example, set to user_b@example.com, where the From header also includes a tag (tag), for example, the tag is set to kg48;

an I1 To header (To header), used to indicate the called user identifier of the IMS session, for example, set to user_b@example.com;

an I1 command sequence (CSeq, Command Sequence), for example, set to CSeq: 98 Invite; and SDP (Session Description Protocol, Session Description Protocol) information, including a PSI DN used by the ICS UE A to initiate a CS call to establish a CS bearer (or known as a CS connection), for example, the PSI DN is set to +12125558888.

Step 203: After receiving the I1 Invite message, ICS UE A stores the I1 Call-ID, I1 From header, I1 To header, and I1 command sequence, and sends a I1 session progress message through the I1 interface, where the I1 session progress message includes the following information:

an I1 Call-ID, copied from the I1 Invite message;

an I1 From header, copied from the I1 Invite message, with the calling user ID being deleted;

an I1 To header, coped from the I1 Invite message, with the called user ID being deleted, where a tag is generated and included, for example, tag=i89r; and an I1 command sequence (CSeq), copied from the I1 Invite message.

Step 204 to step 207: Establish a CS bearer. ICS UE A initiates a CS call by using the PSI DN as a called number; the MSC server or the MGCF in the CS domain performs conversion between CS signaling and SIP signaling, and generates a SIP Invite message (including the PSI DN), where the SIP Invite message is finally transmitted to the SCC AS. The SCC AS associates the stored I1 Invite message by using the PSI DN. The SCC AS sends a final response 200 OK to the MSC server or the MGCF (to indicate that the call is established successfully). The MSC server or the MGCF returns an ACK to acknowledge that the 200 OK is received. The MSC server sends a connect message to UE A to indicate that the CS call is established successfully.

Step 208 to step 210: UE A sends an I1 200 OK response through the I1 interface to indicate that the IMS session is established successfully. The header field of the I1 200 OK is the same as that of the I1 session progress message. The SCC AS sends a SIP 200 OK to UE B, where the SIP 200 OK indicates that UE A already picks up the phone and that the IMS session is established successfully. The UE B sends a SIP ACK request to the SCC AS to acknowledge the 200 OK (received).

In addition to the calling and called scenarios, the I1 interface involves three more scenarios, that is, the fallback (fallback) from Gm interface to I1 interface, switching from Gm interface to I1 interface, and addition of an I1 interface. The foregoing optimization design may also be applicable in these three scenarios.

The following describes the optimization design for service control via the I1 interface in these scenarios of the fallback (fallback) from Gm interface to I1 interface, switching from Gm interface to I1 interface, and addition of an I1 interface.

Embodiment 1: An embodiment of the present invention provides a method for service control via the I1 interface in a Gm fallback scenario. From the perspective of an SCC AS, the execution procedure may include that: The SCC AS sends a SIP Invite message to the ICS UE through the Gm interface; if a response message returned by the ICS UE is received, where the response message indicates that the ICS UE chooses to use the CS bearer and use I1 interface for control, an I1 Invite message is sent to the ICS UE through the I1 interface, where the I1 Invite message includes information indicating that Gm interface (service) control falls back to the I1 interface (service) control and information used to associate the SIP Invite message. Preferably, the foregoing two pieces of information are included in a replace header field. Optionally, the I1 Invite message uses the Call-ID and tag of a SIP dialog as the Call-ID of the I1 interface and the tag of the I1 interface, where the SIP dialog is triggered and generated by the SIP Invite message. Note: For simplification, the tag of the I1 interface may be omitted.

Analysis: Because the UE may obtain a calling user identifier, a called user identifier, and privacy (privacy) through the SIP Invite message, the SCC AS may omit the calling user identifier, called user identifier and privacy when re-delivering a call request (that is, an I1 Invite message). In addition, to enable the UE to associate the I1 call request and the previous SIP Invite message, the SCC AS should include association information, for example, using a replace (replace) header including an SIP dialog (dialog) Call-ID and a tag (the tag is optionally included), and further using the SIP dialog Call-ID and tag by default as the I1 Call-ID and I1 tag respectively. Therefore, the SCC AS does not need to include a new I1 Call-ID and I1 tag (the includes an I1 From tag and an I1 To tag) in the I1 Invite message. In this way, optimization is achieved in the following two aspects: The calling user identifier and the called user identifier are omitted (the UE associates the stored calling user ID and called user ID by using the SIP dialog Call-ID and the tag), and the operation of generating a new I1 Call-ID and I1 tag is omitted.

In the foregoing embodiment, the SCC AS may send a SIP Invite message to UE A through the Gm interface, where the SDP information in the SIP Invite message includes packet switched media (Packet Switched media, PS media) information and circuit switched CS media information. The CS media information indicates that UE A may select the CS bearer, and may also include a PSI DN. UE A decides to use the CS bearer transmit the media streams of the session and use the I1 interface for service control, and returns a SIP session progress (SIP 183) response (indicating that the CS bearer and I1 interface for control are used) to the SCC AS. The SCC AS delivers a call request to UE A through the I1 interface, establishes an IMS session, and releases the SIP dialog.

Figure 3:
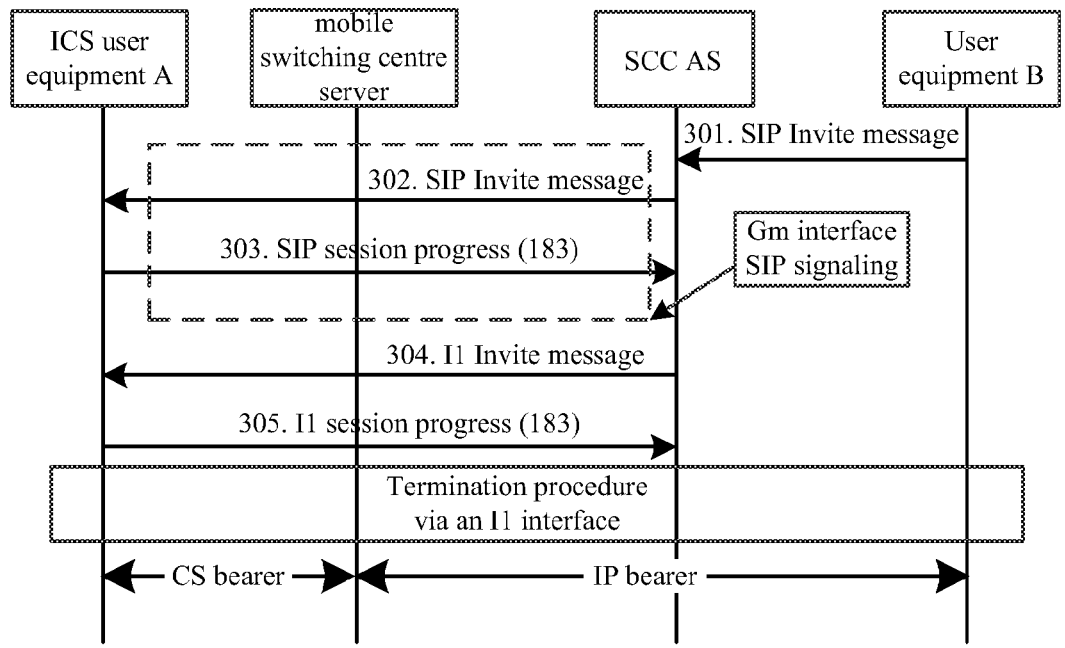
FIG. 3 is a schematic flowchart of a Gm fallback method according to embodiment 1 of the present invention.

More specifically, as shown in FIG. 3, the procedure in the Gm fallback scenario may include the following steps:

Step 301: The SCC AS receives a SIP Invite message that includes a calling user identifier (for example, set to user_b@example.com) and a called user identifier (for example, set to user_a@example.com).

Step 302: The SCC AS sends an I1 Invite message to the ICS UE A through the Gm interface to initiate an IMS session, where the I1 Invite message includes the following information (the SCC AS also stores the information):

a Call-ID (Call-ID), used to identify this IMS session or call, for example, set to I93j9xsKKIg374js7u8JY;

a From header (From header), where the value of the header field is used to indicate the calling user identifier of the IMS session, for example, set to user_b@example.com, where the From header also includes a tag (tag), for example, set to 094P;

a To Header (To Header), used to indicate the called user ID of the IMS session, for example, set to user_a@example.com;

a command sequence (CSeq, Command Sequence), for example, set to 891 Invite; and SDP (Session Description Protocol, Session Description Protocol) information, including PS media information and CS media information, where the CS media information indicates that the UE A may choose the CS bearer, and may include a PSI DN, for example, set to +12125556886.

Step 303: After receiving the SIP Invite message, ICS UE A stores the Call-ID, From header, To header, and CSeq. UE A decides to use the CS bearer to transmit media streams of the session, and returns a response (the returned response may generate a SIP dialog. The SIP dialog is an attribute of the SIP and used for subsequent SIP message communication) to the SCC AS through the Gm interface, for example, 183 (session progress, session progress), where the response includes the following information:

a Call-ID, copied from the SIP Invite message;

a From header, copied from the SIP Invite message;

a To header, copied from the SIP Invite message and including a tag, for example, tag=io7p; and a command sequence (CSeq), copied from the SIP Invite message.

Step 304: The SCC AS sends an I1 Invite message (not including the I1 Call-ID header, I1 From header, and I1 To header) to the UE A through the I1 interface, where the I1 Invite message includes the following information:

an I1 Replace header, where the header field indicates that the I1 Invite replaces the foregoing SIP Invite and includes SIP dialog Call-ID information and tag information; and a command sequence (CSeq, Command Sequence), for example, set to CSeq: 891 Invite.

Step 305: ICS UE A receives the I1 Invite message, identifies, through the I1 Replace header, the fallback from Gm interface to I1 interface, and finds the stored SIP dialog information (including calling and called user identifiers) according to the I1 Replace header information. The UE performs a normal called session (session) establishment process (for the process, reference may be made to the procedure in which an ICS UE is called) via the I1 interface by using the SIP dialog Call-ID and tag as the I1 Call-ID and I1 tag. In addition, the UE or the SCC AS may initiate releasing of the SIP dialog via the Gm interface.

Embodiment 2: An embodiment of the present invention provides a method for service control in a Gm interface control switching scenario. From the perspective of the SCC AS, the execution procedure may include: receiving an I1 Invite message sent by the IMS centralized services user equipment, where the replace header field of the I1 Invite message includes a service control switching request indication and a Session Initiation Protocol dialog ID; searching for an IMS session through the foregoing Session Initiation Protocol dialog ID; and sending an I1 success message to the user equipment to indicate that the I1 interface for service control is switched successfully.

Specifically, the I1 interface Call-ID of the I1 Invite message is a dialog identifier of the Session Initiation Protocol dialog.

In the foregoing embodiment, two technical problems that need to be solved in service control switching are solved. One is the representation of the service control switching request, and the other is the establishment of an I1 Call-ID and I1 tag. A replace (replace) header (carrying the SIP dialog ID of the Gm interface) is included in the I1 Invite request to indicate that the service control of the Gm interface is replaced. In addition, the I1 Call-ID and the I1 tag may reuse the Call-ID and tag of the SIP dialog ID. In this way, the I1 Invite message may omit the transfer of the I1 Call-ID header, I1 From header, and I1 To header. After receiving a service control switching request, the SCC AS returns an I1 200 OK to indicate that the service control is switched successfully. Subsequently, the UE may perform service control through the I1 interface. In this way, optimization is achieved in the following two aspects: The calling and the called user identifiers are omitted (the SCC AS associates the IMS session, the calling user ID and the called user ID with the Replace header), and the operation of generating a new I1 Call-ID and I1 tag is omitted.

Figure 4:
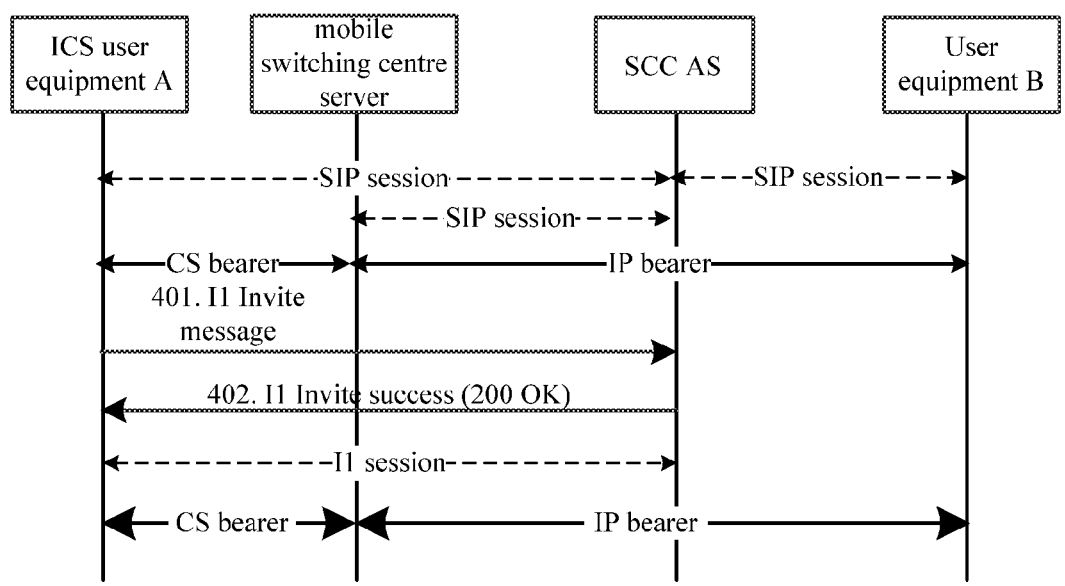
FIG. 4 is a schematic flowchart of a method for Gm switching according to embodiment 2 of the present invention.

More specifically, as shown in FIG. 4, the procedure in a Gm switching scenario may include the following steps:

Step 401: UE A sends an I1 Invite message (not including an I1 Call-ID header, an I1 From header, and an I1 To header; consistent with the information in the SIP dialog by default) to the SCC AS, where the I1 Invite message includes the following information:

a Replace header, where the header field indicates a service control switching request and includes a dialog ID of the SIP dialog; and an I1 command sequence (CSeq, Command Sequence), for example, set to CSeq: 263 Invite.

Step 402: The SCC AS finds the SIP dialog (used to control the IMS session) through the replace header information, and identifies that the IMS session already use the CS bearer to transmit data streams. The SCC AS sends a I1 200 OK to respond to the UE A to indicate that the service control is switched successfully. If the IMS session uses the PS domain to transmit media streams, a CS bearer needs to be created. The SIP dialog Call-ID and tag are used as the I1 Call-ID and I1 tag respectively. Subsequently, the UE may perform service control through the I1 interface. The UE or the SCC AS may initiate the releasing of the SIP dialog.

Embodiment 3: An embodiment of the present invention provides a method for service control in a scenario where service control via an I1 interface is added. From the perspective of the SCC AS, the execution procedure may include that: The SCC AS receives an I1 Invite message sent by the IMS centralized services user equipment, where the I1 Invite message includes a session transfer identifier (Session Transfer Identifier, STI) indicating that service control via an I1 interface is added (or an I1 interface is added), where the STI may be used as a value of a Request uniform resource identifier (Request URI) or the To header (To header); the SCC AS obtains the CS domain number (for example, a Mobile Station ISDN (MSISDN, Mobile Station ISDN) or MDN (Mobile Directory Number, mobile directory number)) of the UE through the lower transport layer, and then searches for an Internet Protocol multimedia subsystem session according to the CS domain number or searches for an Internet Protocol multimedia subsystem session according to the foregoing STI; the SCC AS sends an I1 Invite success message to the user equipment to indicate that the I1 interface is added successfully.

The execution scenario of the foregoing procedure may be as follows: The UE A decides to add an I1 interface in order to hold a current IMS session and establish a second session. In this case, the foregoing I1 Invite message further includes indication information indicating that the current Internet Protocol multimedia subsystem session is held.

Alternatively, the SCC AS may deliver a new IMS session (according to the normal called procedure) through the I1 interface, while UE A needs to hold the first session and connect the second session (a new IMS session). In this case, before the step of receiving an I1 Invite message sent by the IMS centralized services user equipment, the execution procedure further includes: The SCC AS sends an I1 Invite message to the user equipment, and initiates a new Internet Protocol multimedia subsystem session.

Alternatively, the SCC AS may initiate the addition of service control via an I1 interface. The SCC AS makes service control via the I1 interface added through the I1 invite message (not carrying calling and called user identifier). The specific scenario may be as follows: A peer end adds or deletes a video or has other information that needs to be sent to the UE. In this case, from the perspective of the ICS UE, the execution procedure may include:

receiving an I1 Invite message sent by the service centralization and continuity application server, where the I1 Invite message includes a session transfer identifier (session transfer identifier, STI) indicating that service control via the I1 interface is added (or an I1 interface is added), where the STI may be used as a value of the Request uniform resource identifier (Request URI) or the To header (To header).

After the SCC AS initiates the addition of service control via the I1 interface, the SCC AS may send an I1 Invite message (not including calling and called user identifiers) to the UE, where the message includes an STI for indicating the UE that the service control via the I1 interface is added. The creation of an I1 Call-ID and an I1 tag may adopt a manner in the normal I1 interface called process. The current UE has only one IMS session by default. Therefore, the UE may associate the IMS session.

In the above technical solution, the following three technical issues are solved in a case where service control via the I1 interface is added to UE A: one is representation of a request for adding service control via the I1 interface, another is establishment of an I1 Call-ID and an I1 tag, and yet another is how the SCC AS associates the IMS session. An STI (session transfer identifier, used to perform access transfer in the prior art, for example, used to transfer media streams from the CS domain to the PS domain) may be included in the I1 Invite message to indicate a request for adding service control via the I1 interface. The creation of an I1 Call-ID and an I1 tag may adopt a manner in the normal I1 interface calling process. The SCC AS may associate the IMS session by using the STI (if the STI can uniquely identify UE A) or by using the CS domain UE number (for example, an MSISDN or MDN (Mobile Directory Number)) reported by the SCC AS through the lower transport layer. In this way, the optimization is achieved in the following two aspects: The calling and called user identifiers are omitted (The SCC AS searches for the IMS session, the calling and called user identifiers by using the STI or the CS domain UE number).

Figure 5:
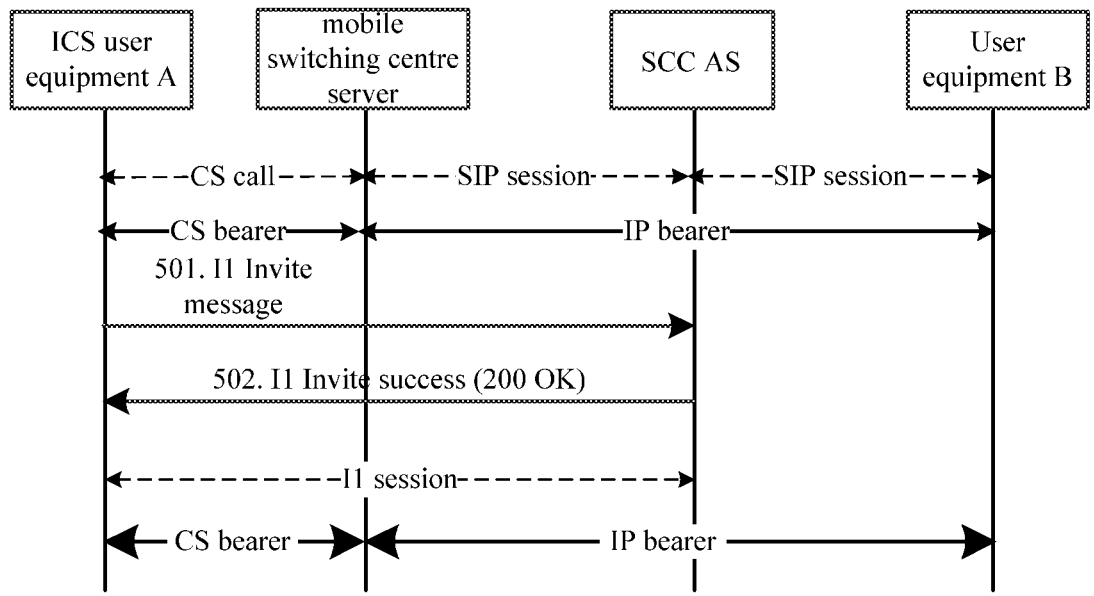
FIG. 5 is a schematic flowchart of a method for adding an I1 interface according to embodiment 3 of the present invention.

More specifically, as shown in FIG. 5, the procedure of the UE adding service control via the I1 interface may include the following steps:

Step 501: UE A sends an I1 Invite message to the SCC AS, where the I1 Invite message includes the following information:

an STI (used as a value of the request (Request) uniform resource identifier (Uniform Resource Identifier, URI) header or the To header), indicating that service control via an I1 interface is added;

an I1 Call-ID header and a From tag; and an I1 command sequence (CSeq, Command Sequence), for example, set to CSeq: 163 Invite.

UE A may include a request for holding the current IMS session, for example, setting a=inactive (inactive).

Step 502: The SCC AS obtains a CS domain number (for example, the MSISDN and the MDN) of UE A through the lower transport layer, and then finds the IMS session through the CS domain number or finds the IMS session through the STI. Then, the SCC AS uses an I1 200 OK (including a To tag) as a response to UE A to indicate that the I1 interface is added successfully.

Figure 6:
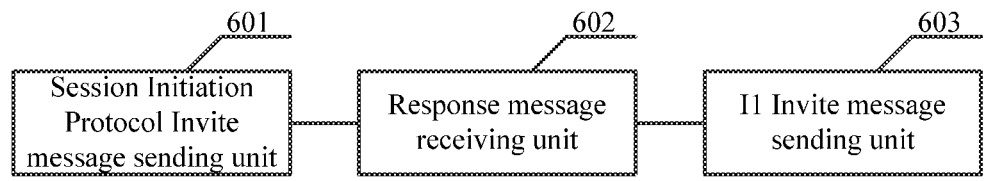
FIG. 6 is a schematic structural diagram of a service centralization and continuity application server according to embodiment 4 of the present invention.

Embodiment 4: As shown in FIG. 6, an embodiment of the present invention provides a service centralization and continuity application server, including:

a Session Initiation Protocol Invite message sending unit 601, configured to send a Session Initiation Protocol Invite message to a user equipment through a Gm interface;

a response message receiving unit 602, configured to receive a response message returned by the user equipment, where the response message indicates that the user equipment chooses to use a circuit switched bearer and use an I1 interface for control; and an I1 Invite message sending unit 603, configured to send an I1 Invite message to the user equipment through the I1 interface if the response message receiving unit 602 receives the response message, where the I1 Invite message carries information indicating that Gm interface control falls back to the I1 interface control and information used to associate the Session Initiation Protocol Invite message.

Figure 7:
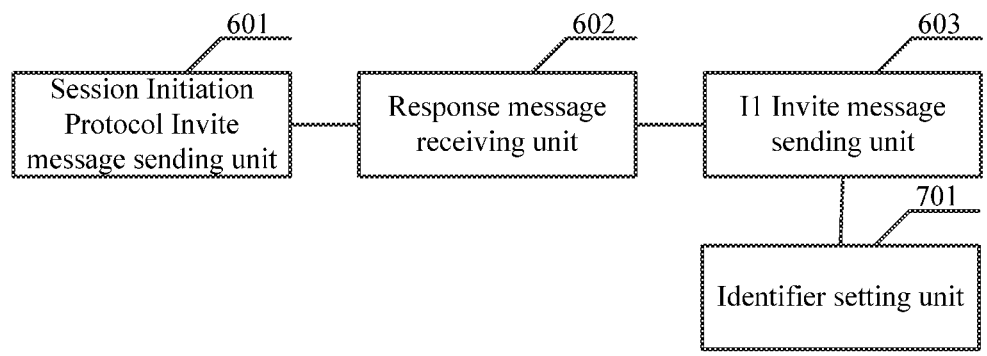
FIG. 7 is a schematic structural diagram of the service centralization and continuity application server according to embodiment 4 of the present invention.

Further, as shown in FIG. 7, the foregoing service centralization and continuity application server includes:

an identifier setting unit 701, configured to set the I1 interface Call-ID of the I1 Invite message to a Call-ID of a dialog of the Session Initiation Protocol Invite message.

In the foregoing embodiment, the replace header of the I1 Invite message is used to carry information indicating that Gm interface control falls back to the I1 interface control and information used to associate the Session Initiation Protocol Invite message, which omits the calling and called user identifiers. In addition, the Call-ID of a dialog of the foregoing Session Initiation Protocol Invite message is used as the I1 interface Call-ID, so the I1 dialog ID may be omitted. Therefore, the overheads of the I1 protocol message are reduced.

Figure 8:
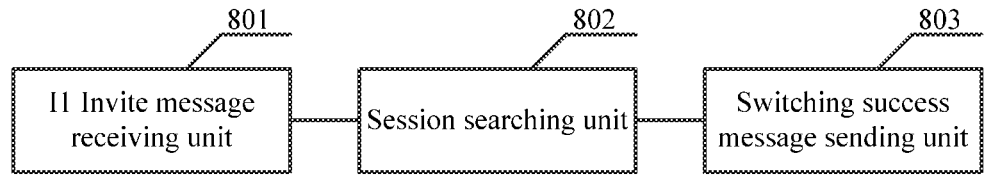
FIG. 8 is a schematic structural diagram of a service centralization and continuity application server according to embodiment 5 of the present invention.

Embodiment 5: As shown in FIG. 8, an embodiment of the present invention provides a service centralization and continuity application server, including:

an I1 Invite message receiving unit 801, configured to receive an I1 Invite message sent by a user equipment, where the I1 Invite message carries a service control switching request indication and a dialog identifier of a Session Initiation Protocol session;

a session searching unit 802, configured to search for a Session Initiation Protocol session by using the dialog identifier of the Session Initiation Protocol session; and a switching success message sending unit 803, configured to send a message, which indicates that service control is switched successfully, to the UE.

Optionally, the I1 interface Call-ID of the I1 Invite message received by the I1 Invite receiving unit 801 is the Call-ID of the Session Initiation Protocol dialog.

In the foregoing embodiment, the I1 Invite message carries the service control switching request indication and the session identifier of the Session Initiation Protocol session, so the calling and called user identifiers may be omitted. In addition, the Call-ID of a dialog of the Session Initiation Protocol Invite message is used as the I1 interface Call-ID, so the I1 dialog ID may be omitted. Therefore, the overheads of the I1 protocol message are reduced.

Figure 9:
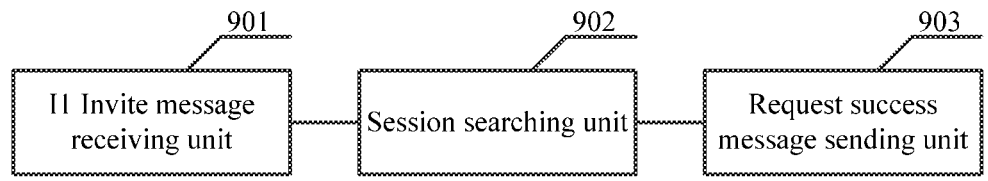
FIG. 9 is a schematic structural diagram of a service centralization and continuity application server according to embodiment 6 of the present invention.

Embodiment 6: As shown in FIG. 9, an embodiment of the present invention provides a service centralization and continuity application server, including:

an I1 Invite message receiving unit 901, configured to: receive an I1 Invite message sent by a user equipment, where the I1 Invite message carries an indication indicating that an I1 interface is added in the IMS session; and the indication indicating that an I1 interface is added in the Internet Protocol multimedia subsystem session is carried by setting a value of a Request uniform resource identifier or a To header of the I1 Invite message to a session transfer identifier, or carried by a public service identity directory number included in the I1 Invite message, where the public service identity directory number is the number of the other party of the IMS session;

a session searching unit 902, configured to search for the Internet Protocol multimedia subsystem session by using the session transfer identifier or the public service identity directory number; or a session searching unit 902, configured to obtain a circuit switched domain number of the user equipment through the lower transport layer, and then search for the Internet Protocol multimedia subsystem session by using the circuit switch domain number; and a request success message sending unit 903, configured to send a message, which indicates that the I1 interface is added successfully, to UE.

In the foregoing embodiment, an I1 Invite message is used to carry an indication indicating that an I1 interface is added in the IMS session, so the calling and called user identifiers are omitted. Therefore, the overheads of the I1 protocol message are reduced.

Figure 10:
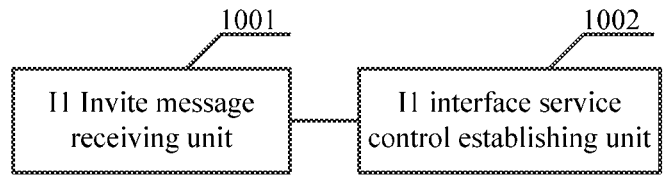
FIG. 10 is a schematic structural diagram of a user equipment according to embodiment 7 of the present invention.

Embodiment 7: As shown in FIG. 10, a seventh embodiment of the present invention provides a user equipment, including:

an I1 Invite message receiving unit 1001, configured to receive an I1 Invite message sent by the service centralization and continuity application server, where the I1 Invite message carries information indicating that service control via an I1 interface is added in the IMS session; and an I1 interface service control establishing unit 1002, configured to: establish the service control via an I1 interface, and associate the service control via the I1 interface with the IMS session.

In the foregoing embodiment, an I1 Invite message is used to carry an indication indicating that an I1 interface is added in the IMS session, so the calling and called user identifiers are omitted. Therefore, the overheads of the I1 protocol message are reduced.

Figure 11:
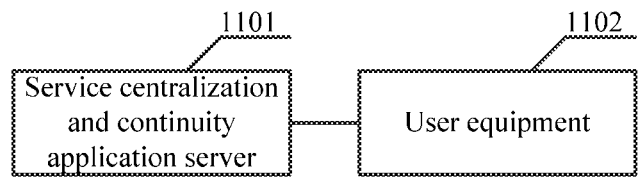
FIG. 11 is a schematic structural diagram of a system for service control via the I1 interface according to embodiment 8 of the present invention.

Embodiment 8: As shown in FIG. 11, an embodiment of the present invention further provides a system for service control via the I1 interface, including:

an service centralization and continuity application server 1101, configured to: send a Session Initiation Protocol Invite message to a user equipment 1102 through the Gm interface; if receiving a response message returned by a user equipment 1102, where the response message indicates that the user equipment chooses to use a circuit switch bearer and an I1 interface for control, send an I1 Invite message to the user equipment 1102 through the I1 interface, where the I1 Invite message carries information indicating that Gm interface control falls back to the I1 interface control and information used to associate the Session Initiation Protocol Invite message; and the user equipment 1102, configured to: after receiving a Session Initiation Protocol Invite message, send a response message to the service centralization and continuity application server, where the response message indicates that the user equipment 1102 chooses the circuit switched bearer and I1 interface for control; receive an I1 Invite message, and parse the I1 Invite message to obtain information indicating that Gm interface control falls back to the I1 interface control and information used to associate the Session Initiation Protocol Invite message.

Optionally, the I1 interface Call-ID of the I1 Invite message sent by the service centralization and continuity application server 1101 is the Call-ID of a dialog of the SIP Invite message.

The user equipment 1102 is further configured to perform a called session establishment process via the I1 interface by using the Session Initiation Protocol Invite message to generate the Call-ID of the dialog as the I1 interface Call-ID.

In the foregoing embodiment, the I1 Invite message is used to carry information indicating that Gm interface control falls back to the I1 interface control and information used to associate the Session Initiation Protocol Invite message, so the calling and called user identifiers may be omitted. In addition, the Call-ID of the dialog of the foregoing Session Initiation Protocol Invite message is used as the I1 interface Call-ID, so the I1 dialog ID may be omitted. Therefore, the overheads of the I1 protocol message are reduced.

Figure 12:
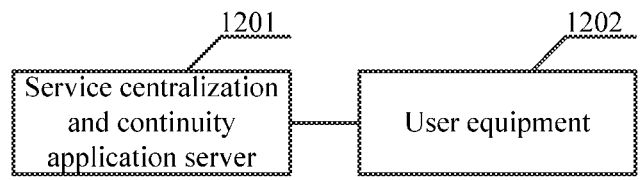
FIG. 12 is a schematic structural diagram of a system for service control via the I1 interface according to embodiment 9 of the present invention.

Embodiment 9: As shown in FIG. 12, an embodiment of the present invention provides a system for service control via an I1 interface, including:

an service centralization and continuity application server 1201, configured to: receive an I1 Invite message sent by a user equipment 1202, where the I1 Invite message carries a service control switching request indication and a Call-ID of the Session Initiation Protocol dialog; search for an Internet Protocol multimedia subsystem session through the Call-ID of the Session Initiation Protocol dialog; and send a message, which indicates that service control is switched successfully, to the user equipment 1202; and the user equipment 1202, configured to: send an I1 Invite message to the service centralization and continuity application server 1201; and receive the I1 success message to know that service control is switched successfully.

Optionally, the I1 interface Call-ID of the I1 Invite message sent by the user equipment 1202 is the Call-ID of the Session Initiation Protocol dialog.

Receiving, by the service centralization and continuity application server 1201, the I1 Invite message sent by the user equipment includes: receiving an I1 Invite message sent by the user equipment, where the I1 interface Call-ID in the I1 Invite message is the session identifier of the Session Initiation Protocol session, and performing a calling session establishment process via the I1 interface.

In the foregoing embodiment, an I1 Invite message is used to carry a service control switching request and a session identifier of the Session Initiation Protocol session, so the calling and called user identifiers may be omitted. In addition, the Call-ID of the dialog of the Session Initiation Protocol Invite message is used as the I1 interface Call-ID, so the I1 dialog ID may be omitted. Therefore, the overheads of the I1 protocol message are reduced.

Figure 13:
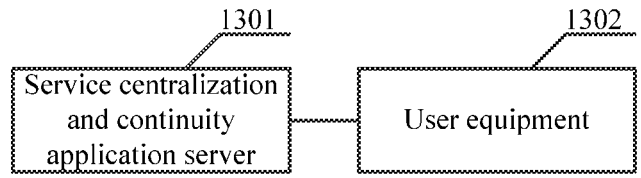
FIG. 13 is a schematic structural diagram of a system for service control via the I1 interface according to embodiment 10 of the present invention.

Embodiment 10: As shown in FIG. 13, an embodiment of the present invention provides a system for service control via the I1 interface, including:

an service centralization and continuity application server 1301, configured to: receive an I1 Invite message sent by a user equipment 1302, where the I1 Invite message carries an indication indicating that an I1 interface is added in an Internet Protocol multimedia subsystem session, where the indication is carried by setting the value of the Request uniform resource identifier or the To header of the I1 Invite message to a session transfer identifier or carried by a public service identity directory number included in the I1 Invite message, and the public service identity directory number is the number of the other party of the Internet Protocol multimedia subsystem session; search for the Internet Protocol multimedia subsystem session through the session transfer identifier or the public service identity directory number, or obtain a circuit switched domain number of the user equipment 1302 through the lower transport layer and search for the Internet Protocol multimedia subsystem session by using the circuit switched domain number; and send a message, which indicates that the I1 interface is added successfully, to the user equipment 1302; and the user equipment 1302, configured to: send an I1 Invite message to the service centralization and continuity application server 1301; and receive an I1 success message to know that the I1 interface is added successfully.

In the foregoing embodiment, an I1 Invite message is used to carry an indication indicating that an I1 interface is added to the IMS session, so the calling and called user identifiers may be omitted. Therefore, the overheads of the I1 protocol message are reduced.

Figure 14:
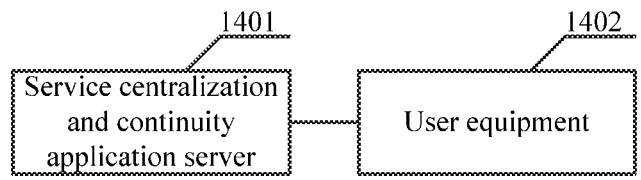
FIG. 14 is a schematic structural diagram of a system for service control via the I1 interface according to embodiment 11 of the present invention.

Embodiment 11: As shown in FIG. 14, an embodiment of the present invention provides a system for service control via the I1 interface, including:

a user equipment 1402, configured to: receive an I1 Invite message sent by an service centralization and continuity application server 1401, where the I1 Invite message indicates that service control via an I1 interface is added in an IMS session, and establish service control via an I1 interface to associate the service control via an I1 interface with the IMS session; and the service centralization and continuity application server 1401, configured to send an I1 Invite message to the user equipment 1402, where the I1 Invite message indicates that service control via an I1 interface is added in the IMS session.

In the foregoing embodiment, an I1 Invite message is used to carry an indication indicating that an I1 interface is added in an IMS session, so the calling and called user identifier may be omitted. Therefore, the overheads of the I1 protocol message are reduced.

Figure 15:
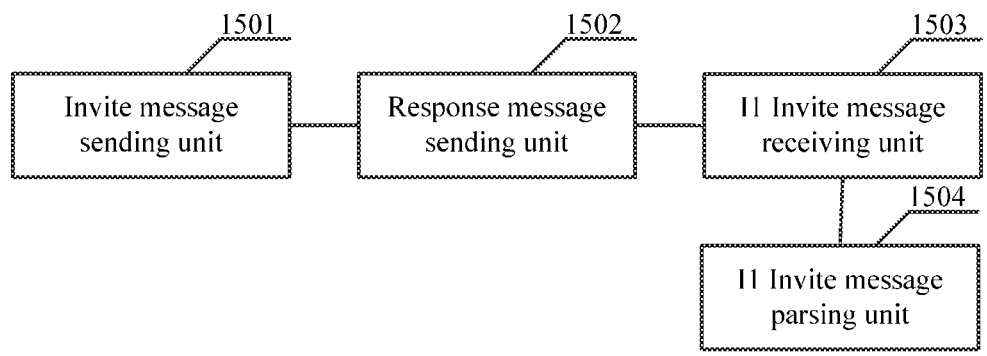
FIG. 15 is a schematic structural diagram of a user equipment according to embodiment 12 of the present invention.

Embodiment 12: As shown in FIG. 15, an embodiment of the present invention provides a user equipment, including:

an Invite message receiving unit 1501, configured to: receive a Session Initiation Protocol Invite message sent by a service centralization and continuity application server through the Gm interface, where the Session Initiation Protocol Invite message carries a response message indicating that a circuit switch bearer and an I1 interface for control are used;

a response message sending unit 1502, configured to: after receiving the Session Initiation Protocol Invite message, send the response message carrying an indication indicating that a circuit switched bearer and an I1 interface for control are used;

an I1 Invite message receiving unit 1503, configured to receive an I1 Invite message via the I1 interface; and an I1 Invite message parsing unit 1504, configured to: parse the I1 Invite message, and obtain information indicating that Gm interface control falls back to the I1 interface control and information used to associate the Session Initiation Protocol Invite message.

Figure 16:
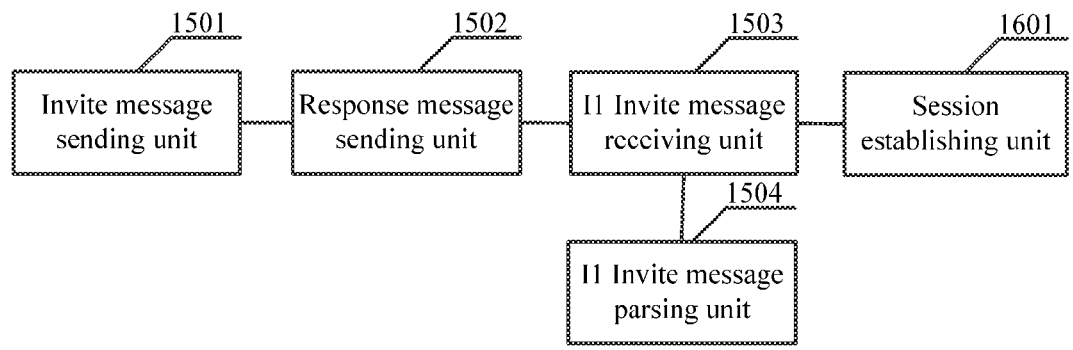
FIG. 16 is a schematic structural diagram of the user equipment according to embodiment 12 of the present invention.

Further, as shown in FIG. 16, the I1 interface Call-ID of the I1 Invite message is a Call-ID of a dialog generated by the Session Initiation Protocol Invite message. The user equipment further includes:

a session establishing unit 1601, configured to perform a called session establishment process via the I1 interface by using the Call-ID of the dialog of the Session Initiation Protocol Invite message as the I1 interface Call-ID.

Figure 17:
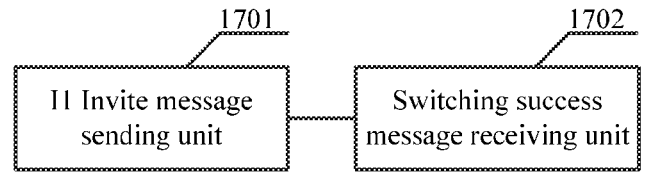
FIG. 17 is a schematic structural diagram of a user equipment according to embodiment 13 of the present invention.

Embodiment 13: As shown in FIG. 17, an embodiment of the present invention provides a user equipment, including:

an I1 Invite message sending unit 1701, configured to send an I1 Invite message to a service centralization and continuity application server, where the I1 Invite message carries a service control switching request indication and a Session Initiation Protocol dialog identifier of an Internet Protocol multimedia subsystem session; and a switching success message receiving unit 1702, configured to receive a message indicating that service control is switched successfully.

Figure 18:
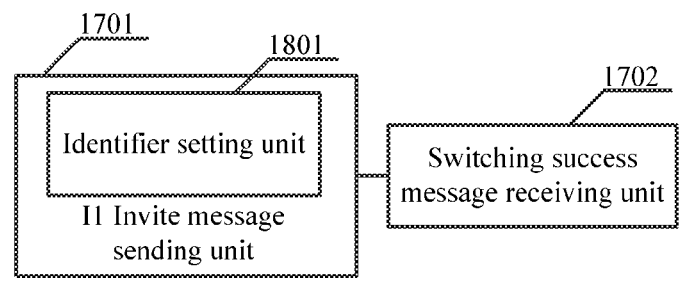
FIG. 18 is a schematic structural diagram of the user equipment according to embodiment 13 of the present invention.

Further, as shown in FIG. 18, the foregoing I1 request sending unit 1601 includes:

an identifier setting unit 1801, configured to set the I1 interface Call-ID of the I1 Invite message to a Call-ID of the Session Initiation Protocol dialog.

The foregoing user equipments and the service centralization and continuity application servers may be used for service control via the I1 interface.

It can be understood by persons of ordinary skill in the art that all or part of the steps in the methods in the embodiments may be performed by a program instructing hardware. The program may be stored in a computer readable storage medium, such as a Read Only Memory, a magnetic disk, and an optical disk.

Detailed above are a method, an apparatus, and a system for service control via the I1 interface according to the embodiments of the present invention. Although the principle and implementation of the present invention are described with reference to specific examples in this document, the embodiments are only intended to help understand the method and core idea of the present invention. In addition, with respect to the specific implementation and application scope, modifications and variations may be made by persons of ordinary skill in the art according to the idea of the present invention. Therefore, the content of the specification shall not be construed as a limitation on the present invention.

What is claimed is:

1. A method for service control via an I1 interface, the method comprising:
    sending a Session Initiation Protocol Invite message for a session to a user equipment through a Gm interface;
    receiving a response message returned by the user equipment, wherein the response message indicates that the user equipment chooses to use a circuit switched bearer for the session and use an I1 interface for service control for the session; and
    sending an I1 Invite message to the user equipment through the I1 interface, wherein the I1 Invite message carries information indicating that Gm interface control falls back to I1 interface control and information used to associate the I1 Invite message with the Session Initiation Protocol Invite message.

2. The method according to claim 1, wherein the information indicating that Gm interface control falls back to I1 interface control and the information used to associate the I1 Invite message with the Session Initiation Protocol Invite message is carried by a replace header field of the I1 Invite message.

3. The method according to claim 1, wherein an I1 interface Call-ID of the I1 Invite message is a Call-ID of a dialog generated by the Session Initiation Protocol Invite message.

4. A service centralization and continuity application server comprising:
    a first transmitter configured to send a Session Initiation Protocol Invite message for a session to a user equipment through a Gm interface;
    a receiver configured to receive a response message returned by the user equipment, wherein the response message indicates that the user equipment chooses to use a circuit switched bearer for the session and use an I1 interface for service control for the session; and
    a second transmitter configured to send an I1 Invite message to the user equipment through the I1 interface, wherein the I1 Invite message carries information indicating that Gm interface control falls back to I1 interface control and information used to associate the I1 Invite message with the Session Initiation Protocol Invite message.

5. The service centralization and continuity application server according to claim 4, further comprising a processor coupled to a non-transitory computer readable medium having computer readable instructions stored thereon that, when executed by the processor, cause the processor to set an I1 interface Call-ID of the I1 Invite message to a Call-ID of a dialog generated by the Session Initiation Protocol Invite message.

6. A user equipment, comprising:
    a receiver configured to receive a Session Initiation Protocol Invite message for a session sent by a service centralization and continuity application server (SCC AS) through a Gm interface; and
    a transmitter configured to send a response message to the SCC AS, wherein the response message indicates that the user equipment chooses to use a circuit switched bearer for the session and use an I1 interface for service control for the session,
    wherein the receiver is further configured to receive an I1 Invite message from the SCC AS through the I1 interface and the I1 Invite message carries information indicating that Gm interface control falls back to I1 interface control and information used to associate the I1 Invite message with the Session Initiation Protocol Invite message.

7. The user equipment according to claim 6, wherein an I1 interface Call-ID of the I1 Invite message is a Call-ID of a dialog generated by the Session Initiation Protocol Invite message, the user equipment further comprises:
    a processor coupled to a non-transitory computer readable medium having computer readable instructions stored thereon that, when executed by the processor, cause the processor to perform a called session establishment process via the I1 interface by using the Call-ID of the dialog of the Session Initiation Protocol Invite message as the I1 interface Call-ID.

\* \* \* \* \*

UNITED STATES PATENT AND TRADEMARK OFFICE
CERTIFICATE OF CORRECTION

PATENT NO.        : 8,886,812 B2                                              Page 1 of 1
APPLICATION NO.   : 13/370843
DATED             : November 11, 2014
INVENTOR(S)       : Long et al.

It is certified that error appears in the above-identified patent and that said Letters Patent is hereby corrected as shown below:

On the Title Page, item (73) Assignee, line 1, delete "Huawei Technologies Co., Inc.," and insert --Huawei Device Co., Ltd.,--.

Signed and Sealed this
Twelfth Day of January, 2016

Michelle K. Lee
*Director of the United States Patent and Trademark Office*